US012626663B2

(12) United States Patent
Lee et al.

(10) Patent No.: US 12,626,663 B2
(45) Date of Patent: May 12, 2026

(54) PIXEL, DISPLAY DEVICE HAVING THE SAME, AND ELECTRONIC DEVICE HAVING THE SAME

(71) Applicant: Samsung Display Co., Ltd., Yongin-si (KR)

(72) Inventors: Jiyoung Lee, Yongin-si (KR); Hyunyoung Choi, Yongin-si (KR); Sang-Gu Lee, Yongin-si (KR); Yongwoo Lee, Yongin-si (KR); Hyung Uk Cho, Yongin-si (KR); Jisong Chae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/081,976

(22) Filed: Mar. 17, 2025

(65) Prior Publication Data

US 2026/0018124 A1 Jan. 15, 2026

(30) Foreign Application Priority Data

Jul. 15, 2024 (KR) ........................ 10-2024-0093262

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01)

(58) Field of Classification Search
CPC ........... H10K 59/00–95; G09G 3/3241; G09G 3/3233; G09G 3/325
See application file for complete search history.

(56) References Cited

FOREIGN PATENT DOCUMENTS

KR 10-2022-0146220 A 11/2022

*Primary Examiner* — Sanjiv D. Patel
(74) *Attorney, Agent, or Firm* — Womble Bond Dickinson (US) LLP

(57) ABSTRACT

Provided are a pixel and a display device having the same. The pixel includes a first transistor, a second transistor, a third transistor, a fourth transistor, a fifth transistor, a sixth transistor, a seventh transistor, a first capacitor, a second capacitor, a third capacitor, and a light-emitting element.

20 Claims, 9 Drawing Sheets

PIXEL, DISPLAY DEVICE HAVING THE SAME, AND ELECTRONIC DEVICE HAVING THE SAME

CROSS-REFERENCE TO RELATED APPLICATION

The present application claims priority to and the benefit of Korean Patent Application No. 10-2024-0093262, filed on Jul. 15, 2024 in the Korean Intellectual Property Office, the entire disclosure of which is incorporated herein by reference.

BACKGROUND

1. Field

Aspects of some embodiments of the present disclosure relate to a pixel, a display device having the same, and an electronic device having the same.

2. Description of the Related Art

A pixel emits light based on a data voltage and includes a transistor (e.g., a thin film transistor; TFT) that controls driving of the pixel. A display device (particularly, an organic light emitting display device) may display images in a progressive emission method in which rows of pixels emit light sequentially, or in a simultaneous emission method in which all pixels emit light simultaneously after sequential data writing is completed.

In order to improve defective displays, such as luminance deviation between pixels, and the like, a display device driven by the simultaneous emission method may further include components inside a pixel to compensate for a threshold voltage of a driving transistor, initialize an anode of an organic light emitting diode, etc. However, when the components for the threshold voltage compensation and the initialization are added, lines and transistors are also added, which causes an increase in pixel size and a difficulty in implementing high resolution.

Accordingly, because a plurality of pixels must be integrated within a narrow area in a high-resolution display device, there is a need to develop a high-density pixel and a display device including the same.

The aforementioned background technology is technical information possessed by the inventor for derivation of the present disclosure or acquired by the inventor during the derivation of the present disclosure, and is not necessarily prior art disclosed to the public before the application of the present disclosure.

The above information disclosed in this Background section is only for enhancement of understanding of the background and therefore the information discussed in this Background section does not necessarily constitute prior art.

SUMMARY

Some embodiments according to the present disclosure include a pixel and a display device including the same. The characteristics of embodiments according to the present disclosure are not limited to the characteristics described above, and other aspects and characteristics of embodiments according to the present disclosure will be understood by the following description and will be more apparent from the embodiments of the present disclosure. Further, it will be readily understood that the aspects and characteristics of embodiments according to the present disclosure can be realized by the characteristics set forth in the appended claims and combinations thereof.

Additional aspects will be set forth in part in the description which follows and, in part, will be apparent from the description, or may be learned by practice of the presented embodiments.

According to some embodiments, a pixel includes a first transistor that includes a gate electrode connected to a first node, a first electrode to receive a first power voltage, and a second electrode connected to a second node; a second transistor that includes a gate electrode to receive a first gate signal, a first electrode to receive a data voltage, and a second electrode connected to the first node; a third transistor that includes a gate electrode to receive a second gate signal, a first electrode connected to a third node, and a second electrode to receive a second power voltage; a fourth transistor that includes a gate electrode to receive a third gate signal, a first electrode connected to the first node, and a second electrode to receive a third power voltage; a fifth transistor that includes a gate electrode to receive a fourth gate signal, a first electrode to receive the third power voltage, and a second electrode connected to a fourth node; a sixth transistor that includes a gate electrode to receive a fifth gate signal, a first electrode to receive the first power voltage, and a second electrode connected to the fourth node; a seventh transistor that includes a gate electrode connected to the fourth node, a first electrode connected to the second node, and a second electrode connected to the third node; a first capacitor that includes a first electrode connected to the first node and a second electrode connected to the second node; a second capacitor that includes a first electrode connected to the second node and a second electrode to receive the second gate signal; a third capacitor that includes a first electrode connected to the fourth node and a second electrode to receive the second gate signal; and a light-emitting element that includes a first electrode connected to the third node and a second electrode to receive the second power voltage.

According to some embodiments, the third transistor may include the second electrode to receive an initialization voltage.

According to some embodiments, the pixel may further include an eighth transistor that includes a gate electrode to receive an emission control signal, a first electrode to receive the first power voltage, and a second electrode connected to a fifth node, and the first electrode of the first transistor may be connected to the fifth node.

According to some embodiments, the pixel may further include an eighth transistor that includes a gate electrode to receive an emission control signal, a first electrode connected to the second node, and a second node connected to a fifth node, and the first electrode of the seventh transistor may be connected to the fifth node.

According to some embodiments, the pixel may further include an eighth transistor that includes a gate electrode to receive an emission control signal, a first electrode connected to the second node, and a second node connected to a fifth node, and the second electrode of the first capacitor may be connected to the fifth node.

According to some embodiments, the second gate signal and the fifth gate signal may change from a first signal to a second signal, and a threshold voltage of the first transistor may be compensated when the third gate signal is the first signal.

According to some embodiments, at a point when the first transistor is turned on, a voltage that the fourth transistor applies to the gate electrode of the first transistor may be equal to a sum of a voltage applied to the second electrode of the first transistor and the threshold voltage of the first transistor.

According to some embodiments, a completely compensated threshold voltage may be maintained for the first transistor when the first transistor, the second transistor, the third transistor, the fourth transistor, the fifth transistor, the sixth transistor, and the seventh transistor are turned off, based on each of the first gate signal, the second gate signal, the third gate signal, the fourth gate signal, and the fifth gate signal being a second signal.

According to some embodiments, the second gate signal, the third gate signal, and the fourth gate signal are each a first signal in a same length of period.

According to some embodiments, the fifth gate signal and the second gate signal may each be the first signal in a same length of period.

According to some embodiments, a display device includes a scan driver that transmits a plurality of scan signals to a plurality of scan lines; a data driver that transmits a plurality of data signals to a plurality of data lines; a display unit that includes a plurality of pixels each connected to a corresponding scan line among the plurality of scan lines and a corresponding data line among the plurality of data lines, wherein the plurality of pixels emit light, respectively, according to corresponding data signals to display an image; and a controller that controls the scan driver and the data driver, generates the plurality of data signals, and applies the generated plurality of data signals to the data driver, wherein each of the plurality of pixels includes: a first transistor that includes a gate electrode connected to a first node, a first electrode to receive a first power voltage, and a second electrode connected to a second node; a second transistor that includes a gate electrode to receive a first gate signal, a first electrode to receive a data voltage, and a second electrode connected to the first node; a third transistor that includes a gate electrode to receive a second gate signal, a first electrode connected to a third node, and a second electrode to receive a second power voltage; a fourth transistor that includes a gate electrode to receive a third gate signal, a first electrode connected to the first node, and a second electrode to receive a third power voltage; a fifth transistor that includes a gate electrode to receive a fourth gate signal, a first electrode to receive the third power voltage, and a second electrode connected to a fourth node; a sixth transistor that includes a gate electrode to receive a fifth gate signal, a first electrode to receive the first power voltage, and a second electrode connected to the fourth node; a seventh transistor that includes a gate electrode connected to the fourth node, a first electrode connected to the second node, and a second electrode connected to the third node; a first capacitor that includes a first electrode connected to the first node and a second electrode connected to the second node; a second capacitor that includes a first electrode connected to the second node and a second electrode to receive the second gate signal; a third capacitor that includes a first electrode connected to the fourth node and a second electrode to receive the second gate signal; and a light-emitting element that includes a first electrode connected to the third node and a second electrode to receive the second power voltage.

According to some embodiments, the third transistor may include the second electrode to receive an initialization voltage.

According to some embodiments, each of the plurality of pixels may further include an eighth transistor that includes a gate electrode to receive an emission control signal, a first electrode to receive the first power voltage, and a second electrode connected to a fifth node, and the first electrode of the first transistor may be connected to the fifth node.

According to some embodiments, each of the plurality of pixels may further include an eighth transistor that includes a gate electrode to receive an emission control signal, a first electrode connected to the second node, and a second electrode connected to a fifth node, and the first electrode of the seventh transistor may be connected to the fifth node.

According to some embodiments, each of the plurality of pixels may further include an eighth transistor that includes a gate electrode to receive an emission control signal, a first electrode connected to the second node, and a second node connected to a fifth node, and the second electrode of the first capacitor may be connected to the fifth node.

According to some embodiments, the second gate signal and the fifth gate signal may change from a first signal to a second signal, and a threshold voltage of the first transistor may be compensated when the third gate signal is the first signal.

According to some embodiments, at a point when the first transistor is turned on, a voltage that the fourth transistor applies to the gate electrode of the first transistor may be equal to a sum of a voltage applied to the second electrode of the first transistor and the threshold voltage of the first transistor.

According to some embodiments, a completely compensated threshold voltage may be maintained for the first transistor when the first transistor, the second transistor, the third transistor, the fourth transistor, the fifth transistor, the sixth transistor, and the seventh transistor are turned off, based on each of the first gate signal, the second gate signal, the third gate signal, the fourth gate signal, and the fifth gate signal being a second signal.

According to some embodiments, the second gate signal, the third gate signal, and the fourth gate signal may each be a first signal in a same length of period.

According to some embodiments, the fifth gate signal and the second gate signal may each be the first signal in a same length of period.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
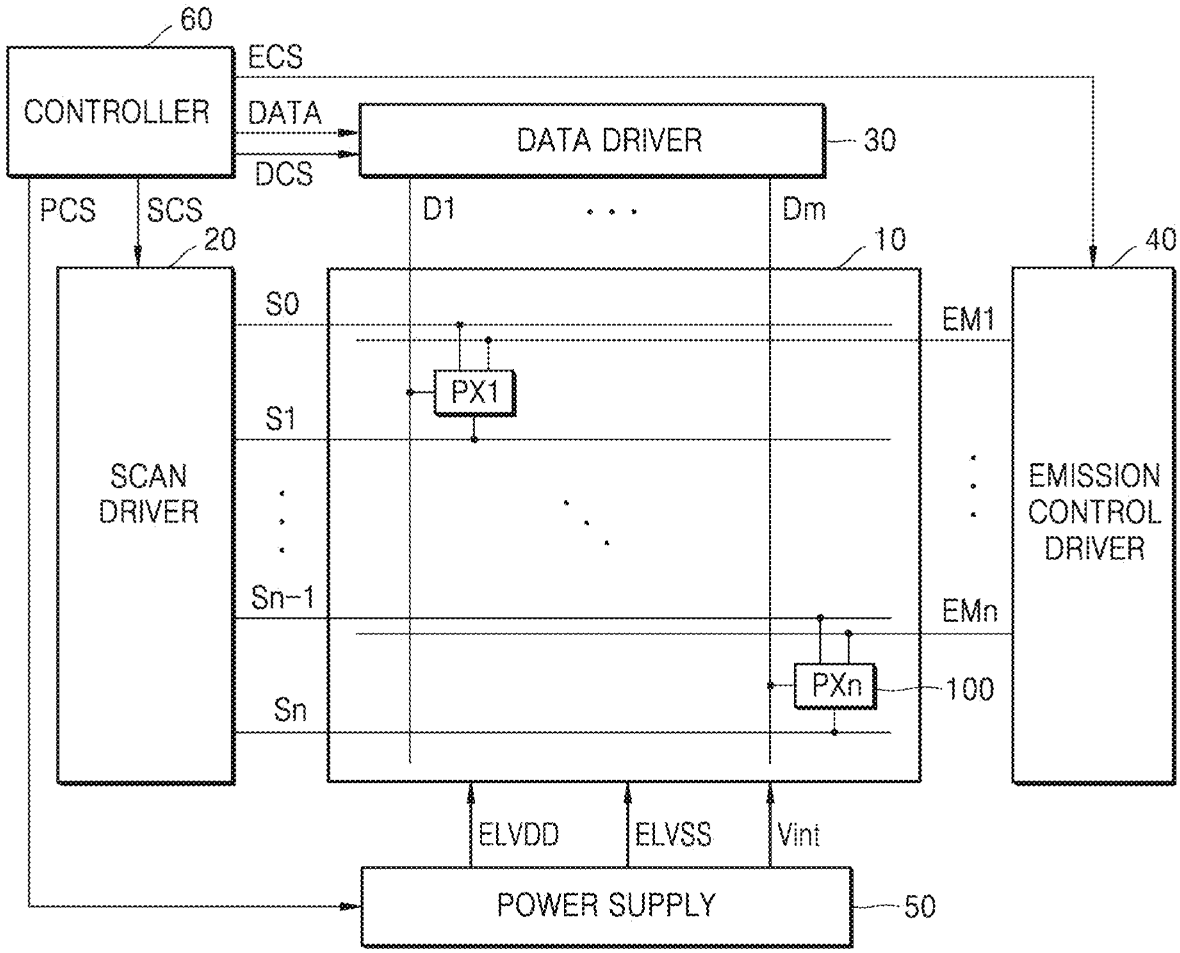
FIG. 1 is a block diagram illustrating a display device according to some embodiments of the present disclosure.

Because aspects of embodiments according to the present disclosure can be modified in various ways and can have various embodiments, aspects of some embodiments will be illustrated in the drawings and specifically described in the detailed description. The characteristics and features of some embodiments of the present disclosure and methods for achieving the same will be more clearly understood by referring to embodiments to be described in more detail below along with the drawings. However, embodiments according to the present disclosure are not limited to the embodiments disclosed below and may be implemented in various forms.

In the following embodiments, terms such as first and second are used not in a limiting sense but for the purpose of distinguishing one component from another component.

In embodiments disclosed below, a singular representation may include a plural representation unless it represents a definitely different meaning from the context.

In embodiments disclosed below, terms such as "include" or "has" should be understood that they are intended to indicate an existence of features or components, disclosed in this specification, and also it is not excluded in advance that one or more features or components are likewise utilized.

In the embodiments disclosed below, when a part such as a unit, area, component, etc. is said to be located on another part, it includes not only the case where the part is directly located on top of the another part, but also the case where other units, areas, components, etc. are interposed therebetween.

In the following embodiments, terms such as "connected" or "coupled" do not necessarily mean "two members being directly and/or fixedly connected or coupled," unless otherwise specified within the context, and do not exclude the intervention of other members between the two members.

In the drawings, the sizes of components may be enlarged or exaggerated or reduced for convenience of explanation. For example, the size and/or thickness of each component illustrated in the drawings are illustrative for convenience of description, and the present disclosure is not necessarily limited thereto.

In the following embodiments, a term "on" used in association with an element state may refer to an activated state of the element, and a term "off" may refer to a deactivated state of the element. A term "on" used in association with a signal received by an element may be referred to as a signal that activates the element, and a term "off" may refer to a signal that deactivates the element. An element may be activated by a high or low voltage. For example, a P-type transistor may be activated by a low voltage. An N-type transistor may be activated by a high voltage. Accordingly, it should be understood that "on" voltages for the P-type transistor and the N-type transistor have opposite voltage levels (low vs. high).

In the following embodiments, when one element is referred to as being "connected to" another element, the element can be directly connected to the another element, or an intervening element can also be interposed therebetween.

Hereinafter, a description will be given in more detail of some embodiments disclosed herein, with reference to the accompanying drawings. For description with reference to the drawings, the same or equivalent components may be given the same reference numerals, and some redundant description thereof may be omitted.

FIG. 1 is a block diagram illustrating a display device according to some embodiments of the present disclosure. According to various embodiments, the display device may be utilized or incorporated into an electronic device, in which the display device is utilized to display images. For example, the electronic device may be a portable electronic device such as a cellular telephone (e.g., a smartphone), a tablet personal computer (PC), a wearable device such as a virtual reality (VR) headset or device, an augmented reality (AR) headset or device, a digital watch (e.g., a smartwatch), a home appliance, an internet of things (IoT) device, and the like. According to various embodiments, the electronic device may be a television, a computer monitor, a roadside billboard, and the like.

Referring to FIG. 1, a display device according to some embodiments of the present disclosure may include a display unit 10 including a plurality of pixels PX1 to PXn, a scan driver 20, a data driver 30, an emission control driver 40, a power supply 50, and a controller 60.

According to some embodiments, each of the plurality of pixels PX1 to PXn may be connected to at least one corresponding scan line among a plurality of scan lines S1 to Sn connected to the display unit 10, at least one corresponding emission control line among a plurality of emission control lines EM1 to EMn, and at least one corresponding data line among a plurality of data lines D1 to Dm.

According to some embodiments, although not directly shown in the display unit 10 of FIG. 1, each of the plurality of pixels PX1 to PXn may be connected to a power supply line, which is connected to the display unit 10, to receive a first power voltage ELVDD, a second power voltage ELVSS, and an initialization voltage Vint.

According to some embodiments, the display unit 10 may include the plurality of pixels PX1 to PXn arranged in a matrix (or approximately in a matrix) form or configuration. According to some embodiments, the plurality of scan lines S1 to Sn and the plurality of emission control lines EM1 to EMn may extend in a row direction (or approximately in a row direction) in the arrangement of the pixels and may be parallel (or substantially parallel) to one another, and the plurality of data lines D1 to Dm may extend in a column direction (or approximately in a column direction) and may be parallel (or substantially parallel) to one another.

According to some embodiments, each of the plurality of pixels PX1 to PXn of the display unit 10 may be connected to two corresponding scan lines. That is, a corresponding pixel may be connected to a scan line corresponding to a pixel row in which the corresponding pixel is included and to a scan line corresponding to a previous pixel row of the pixel row. For example, each of a plurality of pixels included in a first pixel row may be connected to a first scan line S1 and a dummy scan line S0. Likewise, each of a plurality of pixels included in an n-th pixel row may be connected to an n-th scan line Sn corresponding to the n-th pixel row, which is the corresponding pixel row, and an n−1-th scan line Sn−1 corresponding to an n−1-th pixel row, which is a previous pixel row of the n-th pixel row.

According to some embodiments, the plurality of pixels PX1 to PXn may emit light of certain luminance, respectively, by driving currents supplied to organic light emitting diodes according to corresponding data signals transmitted through the plurality of data lines D1 to Dm.

Meanwhile, the display unit 10 may be referred to as a display panel. In the present disclosure, the display panel may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), or may be implemented as other types of flat panel displays or flexible displays.

According to some embodiments, the scan driver 20 may generate scan signals corresponding to the respective pixels and transmit the scan signals through the plurality of scan lines S1 to Sn. That is, the scan driver 20 may transmit the scan signals respectively to the plurality of pixels included in each pixel row through the corresponding scan lines. For example, the scan driver 20 may generate a plurality of scan signals by receiving a scan driving control signal SCS from the controller 60, and sequentially supply the scan signals to the plurality of scan lines S1 to Sn connected to each pixel row.

According to some embodiments, the data driver 30 may transmit a data signal to each pixel through the plurality of data lines D1 to Dm. For example, the data driver 30 may receive a data driving control signal DCS from the controller 60 and apply data signals corresponding to the plurality of data lines D1 to Dm connected respectively to the plurality of pixels included in each pixel row.

According to some embodiments, the emission control driver 40 may be connected to the plurality of emission control lines EM1 to EMn connected to the display unit 10, which includes the plurality of pixels PX1 to PXn arranged in the matrix form. That is, the plurality of emission control lines EM1 to EMn, which extend in parallel (or substantially in parallel) to one another while facing the plurality of pixels in the row direction (or approximately in the row direction), may connect each of the plurality of pixels and the emission control driver 40.

According to some embodiments, the emission control driver 40 may generate emission control signals corresponding to the respective pixels and transmit the generated emission control signals through the plurality of emission control lines EM1 to EMn. Each pixel that receives the emission control signal may be controlled to emit an image according to an image data signal, in response to control of the emission control signal. That is, an operation of an emission control transistor included in each pixel can be controlled in response to an emission control signal transmitted through a corresponding emission control line, and accordingly, an organic light emitting diode connected to the emission control transistor may or may not emit light at a brightness according to a driving current corresponding to a data signal.

According to some embodiments, the power supply 50 may supply a first power voltage ELVDD, a second power voltage ELVSS, and an initialization voltage Vint to each pixel of the display unit 10. For example, the first power voltage ELVDD may be a certain high-level voltage, and the second power voltage ELVSS may be a voltage lower than the first power voltage ELVDD or a ground voltage. For example, the initialization voltage Vint may be set to a voltage value equal to or lower than the second power voltage ELVSS.

Meanwhile, although the voltage values of the first power voltage ELVDD, the second power voltage ELVSS, and the initialization voltage Vint are not particularly limited, those voltage values may be set or controlled under control of a power control signal PCS transmitted from the controller 60.

According to some embodiments, the controller 60 may convert a plurality of image signals transmitted from outside into a plurality of image data signals DATA and transmit the plurality of image data signals DATA to the data driver 30. In addition, the controller 60 may generate control signals for controlling operations of the scan driver 20, the emission control driver 40, and the data driver 30 by receiving a vertical synchronization signal Vsync, a horizontal synchronization signal Hsync, and a clock signal MCLK, and transmit the generated control signals to the corresponding drivers. That is, the controller 60 may generate and transmit a scan driving control signal SCS that controls the scan driver 20, an emission driving control signal ECS that controls the operation of the emission control driver 40, and a data driving control signal DCS that controls the data driver 30. Additionally, the controller 60 may generate a power control signal PCS for controlling the operation of the power supply 50 and transmit the power control signal PCS to the power supply 50.

According to some embodiments, the display device may further include a reference voltage generator. For example, the reference voltage generator may generate a reference voltage VRef based on a control signal received from the controller 60. The reference voltage generator may apply the reference voltage VRef to the data driver 30. The reference voltage VRef may have a value corresponding to each data signal DATA. Meanwhile, the reference voltage generator may be arranged within the controller 60 or within the data driver 30.

According to some embodiments, the data driver 30 may receive the data driving control signal DCS from the controller 60 and the reference voltage VRef from the reference voltage generator. The data driver 30 may convert the data signal DATA into an analog data voltage VDATA using the reference voltage VRef. For example, the data driver 30 may output the data voltage VDATA to the data line.

Meanwhile, according to some embodiments of the present disclosure, the display device may operate during one frame period, which is divided into an emission stop period P1 in which emission is stopped, a first initialization period P2 to initialize a node A, a second initialization period P3 to initialize a node G, a third initialization period P4 to initialize a node S, a compensation period P5 to compensate for a threshold voltage of a first transistor, an off period P6 in which transistors included in the pixels of the display device are turned off, a writing period P7 to sequentially write data voltages in the pixels, an emission period P8 in which the pixels emit light simultaneously, and an emission maintenance period P9. The operation of the display device of the present disclosure will be described in more detail below.

Figure 2:
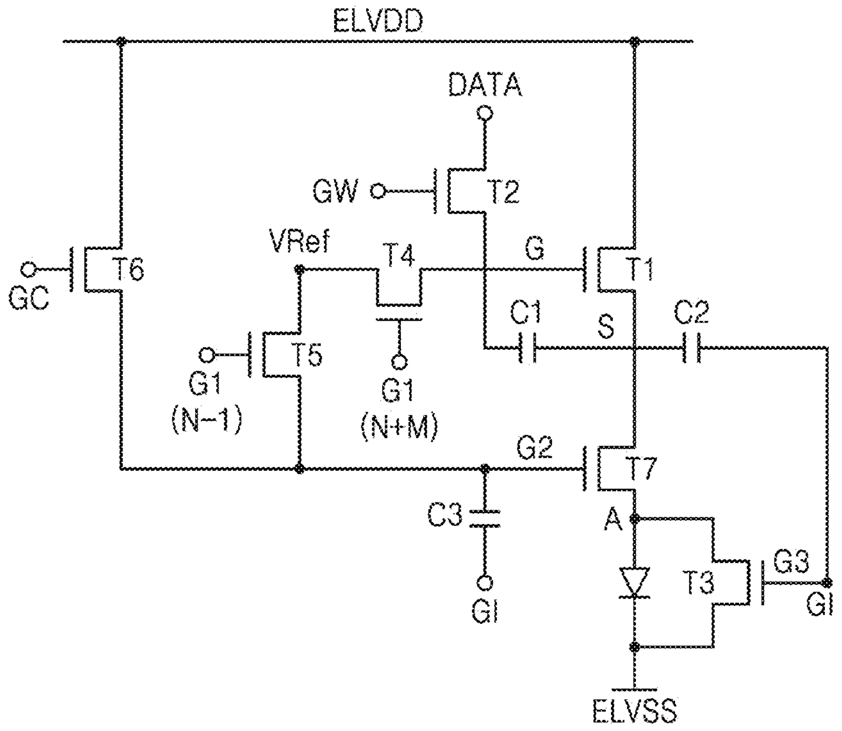
FIG. 2 is a circuit diagram illustrating aspects of a pixel of the display device of FIG. 1.

FIG. 2 is a circuit diagram illustrating one example of a pixel of the display device of FIG. 1. Although FIG. 2 illustrates various components in a circuit diagram of a pixel according to some embodiments, embodiments according to the present disclosure are not limited thereto, and according to some embodiments the pixel may include additional components or fewer components without departing from the spirit and scope of embodiments according to the present disclosure.

Figure 3:
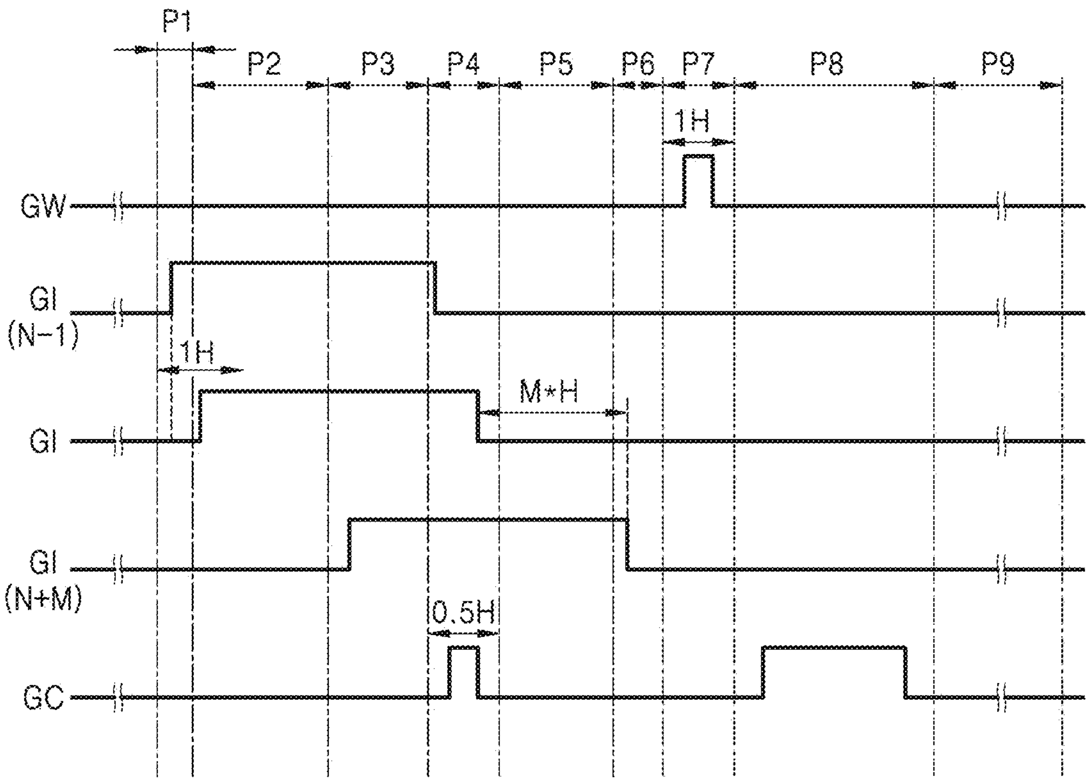
FIG. 3 is a timing diagram illustrating aspects of input signals applied to the pixel of FIG. 2.

FIG. 3 is a timing diagram illustrating one example of input signals applied to the pixel of FIG. 2.

Referring to FIG. 2, the pixel of the display device according to some embodiments of the present disclosure may include a first transistor T1 including a gate electrode connected to a node G (hereinafter, a first node), a first electrode to receive a first power voltage ELVDD, and an a second electrode connected to a node S (hereinafter, a second node), a second transistor T2 including a gate electrode to receive a first gate signal GW, a first electrode to receive a data voltage DATA, and a second electrode connected to the first node, a third transistor T3 including a gate electrode to receive a second gate signal GI, a first electrode connected to a node A (hereinafter, a third node), and a second electrode to receive a second power voltage ELVSS, a fourth transistor T4 including a gate electrode to receive a third gate signal $GI_{N+M}$, a first electrode connected to the first node, and a second electrode to receive a third power voltage VRef, a fifth transistor T5 including a gate electrode to receive a fourth gate signal $GI_{N-1}$, a first electrode to receive the third power voltage VRef, and a second electrode connected to a node G2 (fourth node), a sixth transistor T6 including a gate electrode to receive a fifth gate signal GC, a first electrode to receive the first power voltage ELVDD, a second electrode connected to the fourth node, a seventh transistor T7 including a gate electrode connected to the fourth node, a first electrode connected to the second node, and a second electrode connected to the third node, a first capacitor C1 including a first electrode connected to the first node and a second electrode connected to the second node, a second capacitor C2 including a first electrode connected to the second node and a second electrode to receive the second gate signal GI, a third capacitor C3 including a first electrode connected to the fourth node and a second electrode to receive the second gate signal GI, and a light-emitting element including a first electrode connected to the third node and a second electrode to receive the second power voltage ELVSS.

According to some embodiments, the pixel illustrated in FIG. 2 may receive the first gate signal GW, the second gate signal GI, the third gate signal $GI_{N+M}$, the fourth gate signal $GI_{N-1}$, the fifth gate signal GC, and the data voltage DATA, and display an image by emitting light from the light-emitting element according to a level of the data voltage DATA.

In the present disclosure, as illustrated in FIG. 2, the first to seventh transistors T1 to T7 may be implemented as NMOS transistors. As the first to seventh transistors are implemented as the NMOS transistors, the first to seventh transistors may be turned on based on a high-level signal (hereinafter, a first signal) and turned off based on a low-level signal (hereinafter, a second signal).

According to some embodiments, the first transistor may include the gate electrode connected to the first node, the first electrode receiving the first power voltage ELVDD, and the second electrode connected to the second node. The first transistor may be turned on or off based on a voltage applied to the gate electrode. The first transistor may generate a driving current in response to the data voltage DATA. For example, when the seventh transistor is turned on, the first transistor may supply the driving current to the first electrode of the light-emitting element.

According to some embodiments, the second transistor T2 may include the gate electrode receiving the first gate signal GW, the first electrode receiving the data voltage DATA, and the second electrode connected to the first node. The second transistor T2 may be turned on or off based on the first gate signal GW. The second transistor T2 may be connected to the first transistor T1 at the first node. When turned on based on the first gate signal GW, the second transistor T2 may apply the data voltage VDATA to the gate electrode of the first transistor T1. According to some embodiments, the second transistor T2 may be turned on in the writing period P7.

According to some embodiments, the third transistor T3 may include the gate electrode receiving the second gate signal GI, the first electrode connected to the third node, and the second electrode receiving the second power voltage ELVSS. The third transistor T3 may be turned on or off based on the second gate signal GI. The third transistor T3 may be connected to the light-emitting element at the third node. According to some embodiments, the third transistor T3 may be turned on in the first initialization period P2 and may apply the second power voltage ELVSS to the first electrode of the light-emitting element and the third node. Meanwhile, the third transistor T3 may be connected to the seventh transistor T7 at the third node. According to some embodiments, the third transistor T3 may be turned on in the third initialization period P4, and apply the second power voltage ELVSS to the second node and the first electrode of the seventh transistor T7.

According to some embodiments, the fourth transistor T4 may include the gate electrode receiving the third gate signal $GI_{N+M}$, the first electrode connected to the first node, and the second electrode receiving the third power voltage VRef. The fourth transistor T4 may be turned on or off based on the third gate signal $GI_{N+M}$. Meanwhile, the fourth transistor T4 may be connected to the first transistor T1 at the first node. When the fourth transistor T4 is turned on, the third power voltage VREF may be applied to the gate electrode of the first transistor T1. For example, the fourth transistor T4 may be turned on in the second initialization period P3, the third initialization period P4, and the compensation period P5, and apply the third power voltage VREF to the gate electrode of the first transistor T1.

According to some embodiments, the fourth transistor T5 may include the gate electrode receiving the fourth gate signal $GI_{N-1}$, the first electrode receiving the third power voltage VRef, and the second electrode connected to the fourth node. The fifth transistor T5 may be turned on or off based on the fourth gate signal $GI_{N-1}$. Meanwhile, the fifth transistor T5 may be connected to the seventh transistor T7 at the fourth node. When the fifth transistor T5 is turned on, the third power voltage VRef may be applied to the gate electrode of the seventh transistor T7. For example, the fifth transistor T5 may be turned on in the emission stop period P1 and the first initialization period P1, and apply the third power voltage VRef to the gate electrode of the seventh transistor T7.

According to some embodiments, the sixth transistor T6 may include the gate electrode receiving the fifth gate signal GC, the first electrode receiving the first power voltage ELVDD, and the second electrode connected to the fourth node. The sixth transistor T6 may be turned on or off based on the fifth gate signal GC. According to some embodiments, the sixth transistor T6 may be connected to the seventh transistor T7 at the fourth node. When the sixth transistor T6 is turned on, the sixth transistor T6 may apply the first power voltage ELVDD to the gate electrode of the seventh transistor T7 and control the seventh transistor T7 to be turned on or off. For example, the sixth transistor T6 may be turned on in the third initialization period P4 and the emission period P8 and may apply the first power voltage ELVDD to the gate electrode of the seventh transistor T7.

According to some embodiments, the seventh transistor T7 may include the gate electrode connected to the fourth node, the first electrode connected to the second node, and the second electrode connected to the third node. As described above, the seventh transistor T7 may be turned on or off based on a voltage applied to the gate electrode. For example, the seventh transistor T7 may be turned on based on the first power voltage ELVDD applied through the fourth node, and may be turned off based on the third power voltage VRef. According to some embodiments, the seventh transistor T7 may be turned off in response to the turn-on of the fifth transistor T5, and may be turned on in response to the turn-on of the sixth transistor T6. Meanwhile, the seventh transistor T7 may be turned on in the emission period P8 and the emission maintenance period P9. The seventh transistor T7 may supply the driving current to the light-emitting element in the emission period P7 and the emission maintenance period P9.

According to some embodiments, the first capacitor C1 may include the first electrode connected to the first node and the second electrode connected to the second node. The first capacitor C1 may be connected to the gate electrode of the first transistor T1, the second electrode of the second transistor T2, and the first electrode of the fourth transistor T4 at the first node. In addition, the first capacitor C1 may be connected to the second electrode of the first transistor T1 and the first electrode of the seventh transistor T7 at the second node. According to some embodiments, the first capacitor C1 may store a certain voltage to compensate for a threshold voltage of the first transistor T1. For example, the first capacitor C1 may store a part of a voltage supplied from the second gate signal GI in the compensation period P5 and the writing period P7.

According to some embodiments, the second capacitor C2 may include the first electrode connected to the second node and the second electrode receiving the second gate signal GI. The second capacitor C2 may be connected to the second electrode of the first transistor T1 and the first capacitor C1 at the second node. According to some embodiments, the second capacitor C2 may store a certain voltage to compensate for the threshold voltage of the first transistor T1. For example, the second capacitor C2 may store a part of a voltage supplied from the second gate signal GI in the compensation period P5 and the writing period P7. In more detail, the first capacitor C1 and the second capacitor C2 may store, in a dividing manner, parts of a voltage supplied from the second gate signal GI based on a capacitor capacity ratio. Through this, the threshold voltage of the first transistor T1 can be compensated in the compensation period P5 and the writing period P7, as will be described later. Meanwhile, the capacity of the first capacitor C1 and the capacity of the second capacitor C2 may be a preset value. For example, the capacity of the first capacitor C1 and the capacity of the second capacitor C2 may be set to 150 fF.

According to some embodiments, the third capacitor C3 may include the first electrode connected to the fourth node and the second electrode receiving the second gate signal GI. The third capacitor C3 may be connected to the second electrode of the fifth transistor T5, the second electrode of the sixth transistor T6, and the gate electrode of the seventh transistor T7 at the fourth node. According to some embodiments, the third capacitor C3 may store a part of a voltage supplied to the gate electrode of the seventh transistor T7. For example, the third capacitor C3 may store a part of the first power voltage ELVDD applied from the sixth transistor T6 or a part of the third power voltage VRef applied from the fifth transistor T5. Meanwhile, the capacitor capacity of the third capacitor C3 may be a preset value. For example, the capacity of the third capacitor C3 may be set to 40 fF.

According to some embodiments, the light-emitting element may be implemented as an organic light emitting diode (OLED). The light-emitting element may include the first electrode connected to the third node and the second electrode receiving the second power voltage ELVSS. As an example, the light-emitting element may be connected to the third transistor T3 at the third node. For example, in the first initialization period P2, the second power voltage ELVSS may be applied from the third transistor T3 to initialize the first electrode of the light-emitting element. According to some embodiments, the light-emitting element may be connected to the fifth transistor T7 at the third node. For example, in the emission period P9 and the emission maintenance period P9, the light-emitting element may receive the driving current applied from the seventh transistor T7, and emit light based on the driving current.

Meanwhile, the first power voltage ELVDD, the second power voltage ELVSS, and the third power voltage VREF may be preset values. For example, the first power voltage ELVDD may be set to 13 V, the second power voltage ELVSS may be set to 2 V, and the third power voltage VREF may be set to 0 V.

Referring to FIG. 3, the operation of the pixel according to some embodiments of the present disclosure may be controlled based on the first gate signal GW, the second gate signal GI, the third gate signal $GI_{N+M}$, the fourth gate signal $GI_{N-1}$, and the fifth gate signal GC. In more detail, the operation of the pixel may be divided into a first period P1 to a ninth period P9 based on signal states of the first gate signal GW, the second gate signal GI, the third gate signal $GI_{N+M}$, the fourth gate signal $GI_{N-1}$, and the fifth gate signal GC. Here, the signal state of each of the first gate signal GW, the second gate signal GI, the third gate signal $GI_{N+M}$, the fourth gate signal $GI_{N-1}$, and the fifth gate signal GC may be any one of a first signal that is a relatively high-level signal, and a second signal that is a lower-level signal than the first signal. According to some embodiments, the first signal may mean a high signal, and the second signal may mean a low signal.

In the timing diagram illustrated in FIG. 3, 1 H may denote a certain unit time. The unit time may be a preset value. For example, 1 H may be set to 3.93 μs.

As illustrated in FIG. 3, with respect to the second gate signal GI, the third gate signal $GI_{N+M}$ may be a signal shifted by M*H, and the fourth gate signal $GI_{N-1}$ may be a signal shifted by 1 H. According to some embodiments, the second gate signal GI, the third gate signal $GI_{N+M}$, and the fourth gate signal $GI_{N-1}$ may each be the first signal (high) in the same length of period.

According to some embodiments, in the first period P1, the fourth gate signal $GI_{N-1}$ may change from the second signal to the first signal, and the other signals may all be the second signal. According to some embodiments, the fifth transistor T5 may be turned off, in response to the change of the fourth gate signal $GI_{N-1}$ from the second signal to the first signal. In addition, the seventh transistor T7 may be turned off, in response to the turn-off of the fifth transistor T5. According to some embodiments, the first period P1 may be referred to as an emission stop period in which emission is stopped by turning off the seventh transistor T7.

According to some embodiments, in the second period P2, each of the first gate signal GW, the third gate signal $GI_{N+M}$, and the fifth gate signal GC may be the second signal. In addition, the second gate signal GI may change from the second signal to the first signal, and the fourth gate signal $GI_{N-1}$ may be the first signal. According to some embodiments, the second transistor T2, the fourth transistor T4, and the sixth transistor T6 may be turned off when each of the first gate signal GW, the third gate signal $GI_{N+M}$, and the fifth gate signal GC is the second signal. In addition, the third transistor T3 may be turned on when the second gate signal GI changes to the first signal. In response to the third transistor T3 being turned on, the voltage of the third node may be initialized to the second power voltage ELVSS. According to some embodiments, the second period P2 may be referred to as a first initialization period in which the third node (node A) is initialized.

According to some embodiments, in the third period P3, the first gate signal GW and the fifth gate signal GC may be the second signal. In addition, the second gate signal GI and the fourth gate signal $GI_{N-1}$ may be the first signal, and the third gate signal $GI_{N+M}$ may change from the second signal to the first signal. According to some embodiments, the second transistor T2 and the sixth transistor T6 may be turned off when each of the first gate signal GW and the fifth gate signal GC is the second signal. The third transistor T3, the fourth transistor T4, and the fifth transistor T5 may be turned on when each of the second gate signal GI, the third gate signal $GI_{N+M}$, and the fourth gate signal $GI_{N-1}$ is the first signal. In response to the fourth transistor T4 being turned on, the voltage of the gate electrode of the first transistor T1 may be initialized to the third power voltage VRef and the first transistor T1 may be turned off. Also, in response to the fifth transistor T5 being turned on, the voltage of the gate electrode of the seventh transistor T7 may be initialized to the third power voltage VRef. According to some embodiments, the third period P3 may be referred to as a second initialization period in which the gate electrodes of the first transistor T1 and the seventh transistor T7 are initialized.

According to some embodiments, in the fourth period P4, the first gate signal GW may be the second signal, and the fourth gate signal $GI_{N-1}$ may change from the first signal to the second signal. In addition, each of the second gate signal GI and the third gate signal $GI_{N+M}$ may be the first signal, and the fifth gate signal GC may change from the second signal to the first signal. The fifth transistor T5 may be turned off when the fourth gate signal $GI_{N-1}$ changes from the first signal to the second signal. The sixth transistor T6 may be turned on when the fifth gate signal GC changes from the second signal to the first signal. In response to the sixth transistor T6 being turned on, a part of the first power voltage ELVDD may be applied to the gate electrode of the seventh transistor T7 and the seventh transistor T7 may be turned on. In response to the seventh transistor T7 being turned on, the second power voltage ELVSS applied to the second electrode of the seventh transistor T7 may be supplied to the first electrode of the seventh transistor T7. According to some embodiments, because the second power voltage ELVSS which is being applied to the second electrode of the seventh transistor T7 can be applied to the second node, the fourth period P4 may be referred to as a third initialization period in which the second node is initialized.

According to some embodiments, in the fifth period P5, each of the first gate signal GW, the fourth gate signal $GI_{N-1}$, and the fifth gate signal GC may be the second signal, and the third gate signal $GI_{N+M}$ may be the first signal. Additionally, the second gate signal GI may change from the first signal to the second signal. According to some embodiments, because only the third gate signal $GI_{N+M}$ is the first signal, only the fourth transistor T4 may be turned on and the other transistors T1, T2, T3, T5, T6, and T7 may be turned off. As the second gate signal GI changes from the first signal to the second signal, a level of a voltage applied from the second gate signal GI may change. In addition, a level of a voltage applied to the second node may also change. The first capacitor C1 and the second capacitor C2 connected to each other at the second node may store in a dividing manner a voltage variation applied from the second gate signal GI based on the capacitor capacity ratio, and adjust the change in level of the voltage applied to the second node. According to some embodiments, when a certain time has elapsed because the second gate signal GI changed from the first signal to the second signal, a difference between a voltage VRef applied to the first node and a voltage applied to the second node may be the same as the threshold voltage of the first transistor T1. At this point, the first transistor T1 may be turned on. According to some embodiments, the threshold voltage of the first transistor T1 may be compensated when the second gate signal GI and the fifth gate signal GC change from the first signal to the second signal and the third gate signal $GI_{N+M}$ is the first signal. That is, the fifth period may be referred to as a compensation period in which the threshold voltage of the first transistor T1 is compensated. In addition, at the moment when the first transistor T1 is turned on, a voltage that the fourth transistor T4 applies to the gate electrode of the first transistor T1 may be the same as the sum of a voltage applied to the second electrode of the first transistor T1 and the threshold voltage of the first transistor T1.

According to some embodiments, in the sixth period P6, each of the first gate signal GW, the second gate signal GI, the fourth gate signal $GI_{N-1}$, and the fifth gate signal GC may be the second signal. Additionally, the third gate signal $GI_{N+M}$ may change from the first signal to the second signal. In other words, the sixth period P6 may be referred to as an off period in which all transistors T1 to T7 are turned off in response to every signal being the second signal. According to some embodiments of the present disclosure, even if the third gate signal $GI_{N+M}$ changes from the first signal to the second signal in the off period P6, the completely compensated threshold voltage may be maintained for the first transistor T1. In addition, even if the first transistor T1 is turned on based on a leakage voltage in the fourth transistor T4, the completely compensated threshold voltage may be maintained for the first transistor T1.

According to some embodiments, in the seventh period P7, each of the second gate signal GI, the third gate signal $GI_{N+M}$, the fourth gate signal $GI_{N-1}$, and the fifth gate signal GC may be the second signal. In addition, the first gate signal GW may change from the second signal to the first signal. The second transistor T2 may be turned on, in response to the first gate signal GW being the first signal. In response to the second transistor T2 being turned on, the data voltage DATA may be applied to the first node. According to some embodiments, the seventh period P7 may be referred to as a writing period in which the data voltage DATA is applied to the gate voltage of the first transistor T1. In the writing period P7, the first transistor T1 may be turned on.

According to some embodiments, in the eighth period P8, each of the first gate signal GW, the second gate signal GI, the third gate signal $GI_{N+M}$, and the fourth gate signal $GI_{N-1}$ may be the second signal. In addition, the fifth gate signal GC may change from the second signal to the first signal. The sixth transistor T6 may be turned on, in response to the fifth gate signal GC being the first signal. When the sixth transistor T6 is turned on, the first power voltage ELVDD may be applied to the gate electrode of the seventh transistor T7 and the seventh transistor T7 may be turned on. When the seventh transistor T7 is turned on, a driving current applied from the first transistor T1 may be supplied to the light-emitting element. According to some embodiments, the eighth period may be referred to as an emission period.

According to some embodiments, in the ninth period P9, each of the first gate signal GW, the second gate signal GI, the third gate signal $GI_{N+M}$, and the fourth gate signal $GI_{N-1}$ may be the second signal. In addition, the fifth gate signal GC may change from the first signal to the second signal. In response to the change of the fifth gate signal GC from the first signal to the second signal, the sixth transistor T6 may be turned off. Because the third capacitor C3 can apply the stored voltage to the gate electrode of the seventh transistor T7, the seventh transistor T7 may be continuously turned on. According to some embodiments, because the seventh transistor T7 can supply the driving current applied from the first transistor T1 to the light-emitting element while maintaining the turn-on state, the ninth period may be referred to as an emission maintenance period.

Figure 4:
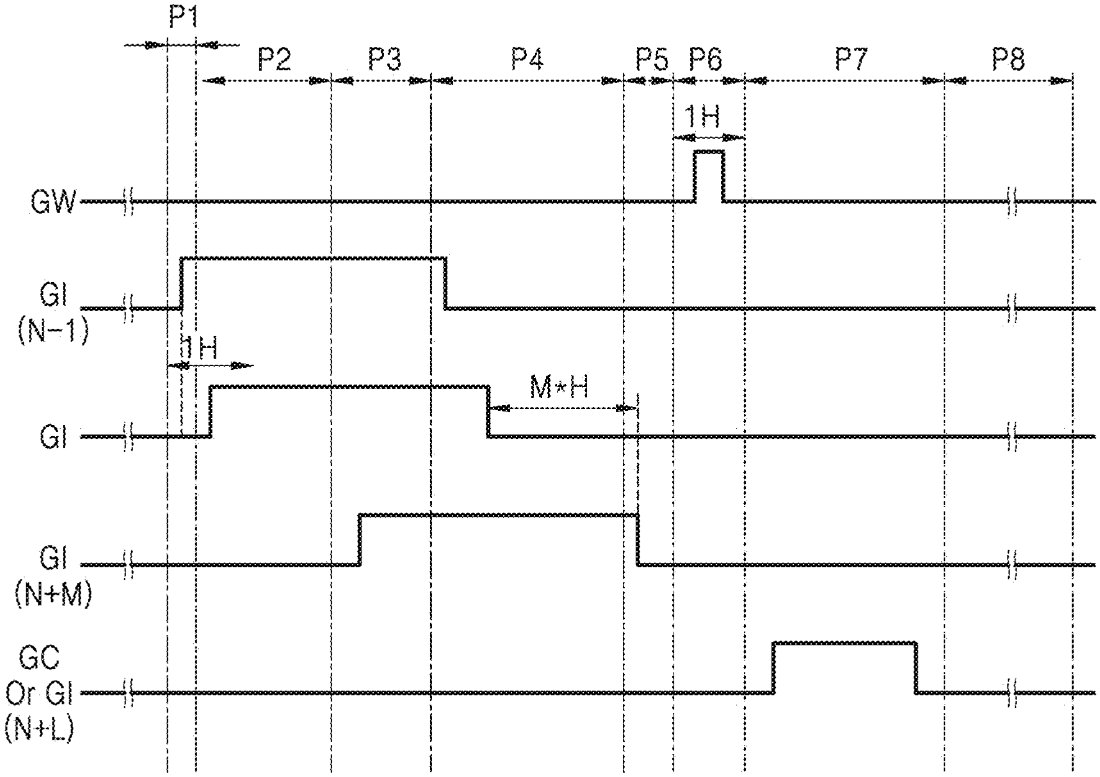
FIG. 4 is a timing diagram illustrating aspects of input signals applied to the pixel of FIG. 2.

FIG. 4 is a timing diagram illustrating further details of input signals applied to the pixel of FIG. 2, according to some embodiments.

Referring to FIG. 4, the operation of the pixel according to some embodiments of the present disclosure may be divided into a first period P1 to an eighth period P8 based on signal states of the first gate signal GW, the second gate signal GI, the third gate signal $GI_{N+M}$, the fourth gate signal $GI_{N-1}$, and the fifth gate signal GC.

The first period P1 illustrated in FIG. 4 may be the same as the emission stop period described above in FIG. 3, and the second period P2 may be the same as the first initialization period described above in FIG. 3, and the third period P3 may be the same as the second initialization period described above in FIG. 3. In addition, the fourth period P4 may be the same as the compensation period described above in FIG. 3, the fifth period P5 may be the same as the off period described above in FIG. 3, the sixth period P6 may be the same as the writing period described above in FIG. 3, the seventh period P7 may be the same as the emission period described above in FIG. 3, and the eighth period P8 may be the same as the emission maintenance period. Because the description of each period is the same as that given above in FIG. 3, some redundant descriptions may be omitted.

According to some embodiments, the operation of the pixel may omit the third initialization period. According to some embodiments, when the threshold voltage of the first transistor T1 can be compensated based on a voltage applied to the second electrode of the first transistor T1 in the third period P3, the third initialization period in which the voltage applied to the second electrode of the first transistor T1 is initialized may be omitted. For example, according to some embodiments, the range of the voltage applied to the second electrode of the first transistor T1 may be set according to the range of preset power voltage values. The third initialization period may be omitted if the threshold voltage of the first transistor T1 can be compensated based on the maximum voltage applied to the second electrode of the first transistor T1.

According to some embodiments, if the third initialization period is omitted, the flow of the fifth gate signal GC may change. For example, as illustrated in FIG. 4, the fifth gate signal GC and the second gate signal GI may each be the first signal in the same length of period. According to some embodiments, a fifth gate signal $GI_{N+L}$ may be the same signal as a signal shifted by L*H with respect to the second gate signal GI.

Figure 5:
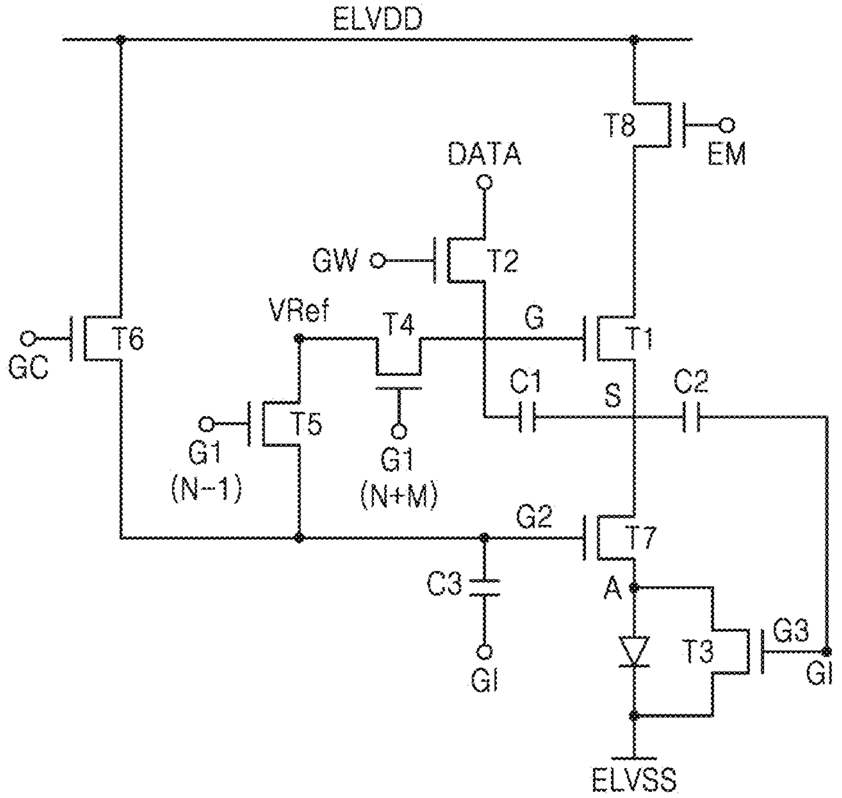
FIG. 5 is a circuit diagram illustrating aspects of a pixel of the display device of FIG. 1.

FIG. 5 is a circuit diagram illustrating further details of a pixel of the display device of FIG. 1, according to some embodiments. Although FIG. 5 illustrates various components in a circuit diagram of a pixel according to some embodiments, embodiments according to the present disclosure are not limited thereto, and according to some embodiments the pixel may include additional components or fewer components without departing from the spirit and scope of embodiments according to the present disclosure.

Figure 6:
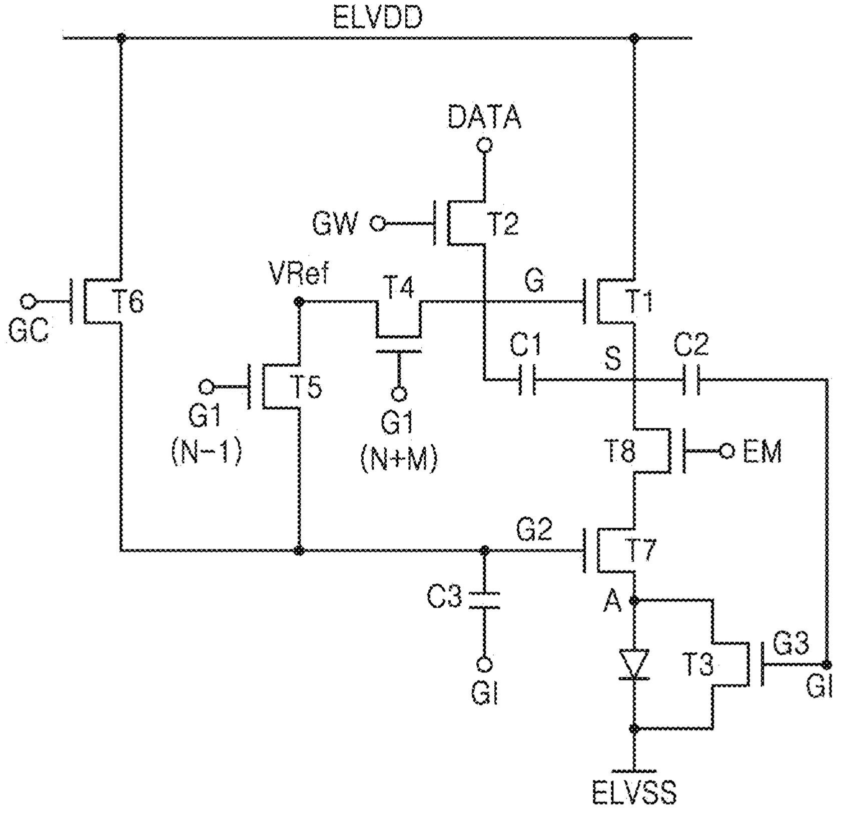
FIG. 6 is a circuit diagram illustrating aspects of a pixel of the display device of FIG. 1.

FIG. 6 is a circuit diagram illustrating further details of a pixel of the display device of FIG. 1, according to some embodiments. Although FIG. 6 illustrates various components in a circuit diagram of a pixel according to some embodiments, embodiments according to the present disclosure are not limited thereto, and according to some embodiments the pixel may include additional components or fewer components without departing from the spirit and scope of embodiments according to the present disclosure.

Figure 7:
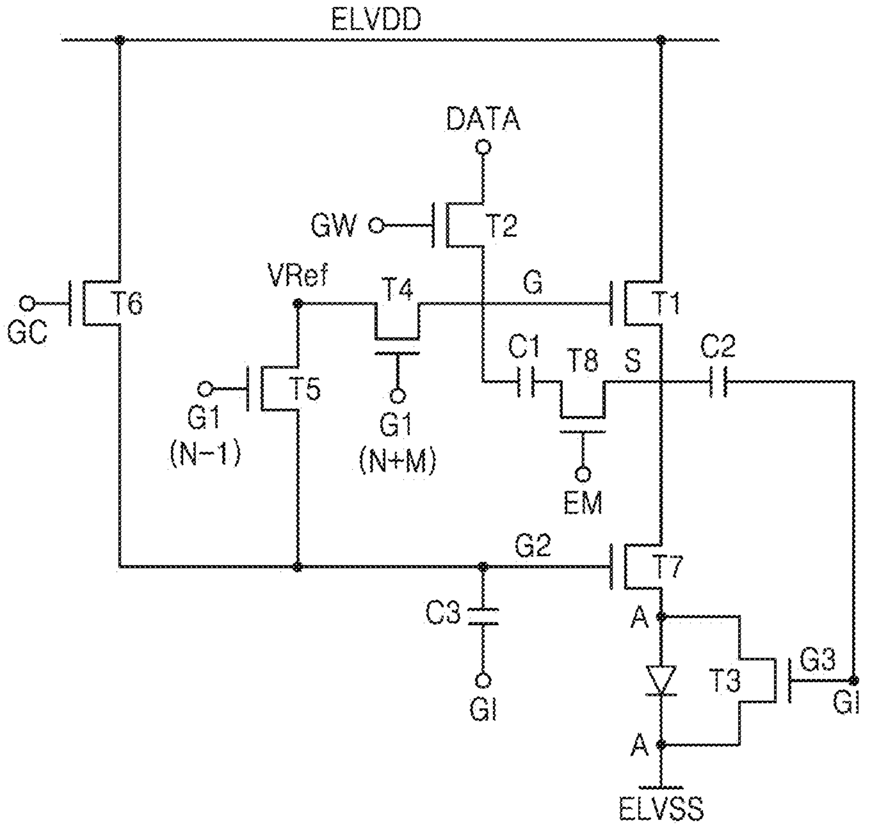
FIG. 7 is a circuit diagram illustrating aspects of a pixel of the display device of FIG. 1.

FIG. 7 is a circuit diagram illustrating further details of a pixel of the display device of FIG. 1, according to some embodiments. Although FIG. 7 illustrates various components in a circuit diagram of a pixel according to some embodiments, embodiments according to the present disclosure are not limited thereto, and according to some embodiments the pixel may include additional components or fewer components without departing from the spirit and scope of embodiments according to the present disclosure.

Figure 8:
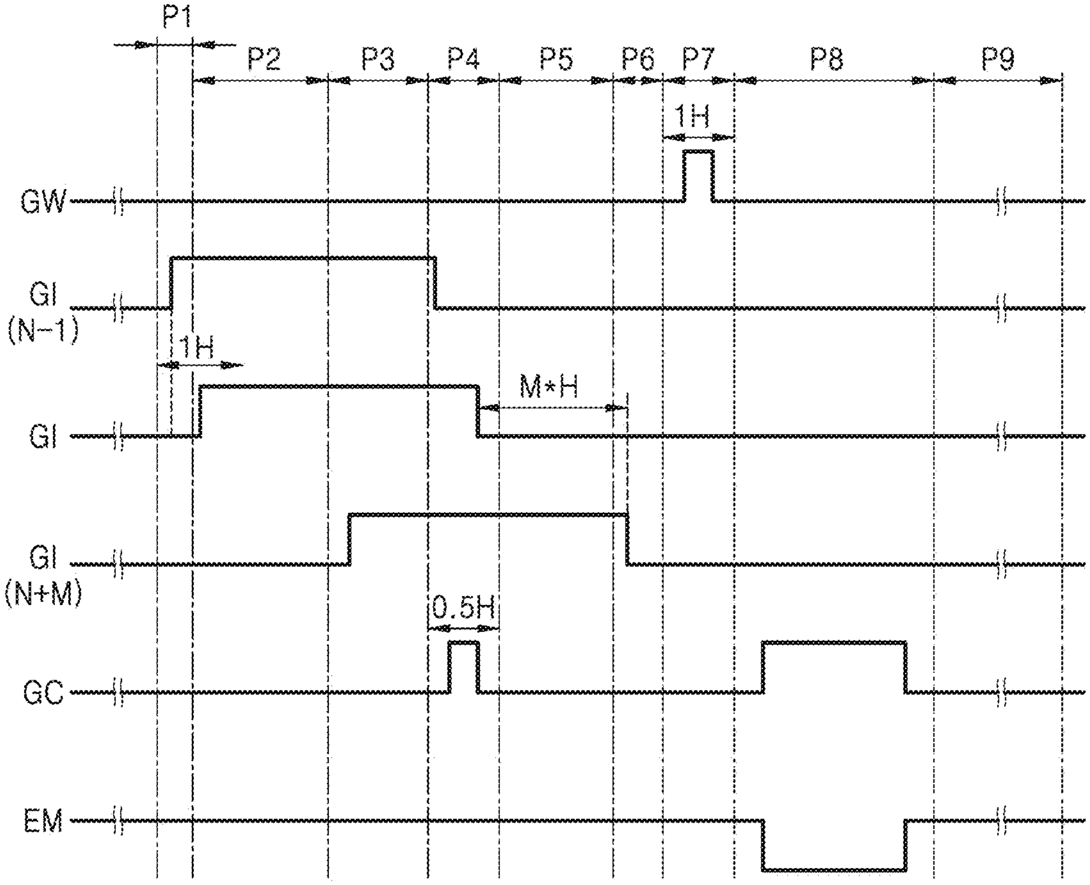
FIG. 8 is a timing diagram illustrating aspects of input signals applied to the pixels of FIGS. 5 to 7.

FIG. 8 is a timing diagram illustrating one example of input signals applied to the pixels of FIGS. 5 to 7.

According to some embodiments, as illustrated in FIGS. 5 to 7, first to eighth transistors T1 to T8 may be implemented as NMOS transistors. As the first to eighth transistors are implemented as the NMOS transistors, the first to eighth transistors may be turned on based on a high-level signal (hereinafter, a first signal) and turned off based on a low-level signal (hereinafter, a second signal).

Referring to FIG. 5, the pixel according to some embodiments of the present disclosure may further include an eighth transistor T8.

According to some embodiments, the eighth transistor T8 may include a gate electrode receiving an emission control signal EM, a first electrode receiving the first power voltage ELVDD, and a second electrode connected to a node N (hereinafter, a fifth node).

According to some embodiments, the eighth transistor T8 may be turned on or off based on the emission control signal EM. Meanwhile, the eighth transistor T8 may be connected to the first transistor T1 at the fifth node (node N). When the eighth transistor T8 is turned on, the first power voltage ELVDD may be applied to the first transistor T1. For example, the eighth transistor T8 may be turned on in the emission period P8 and the emission maintenance period P9 and may apply the first power voltage ELVDD to the first electrode of the first transistor T1.

Meanwhile, according to some embodiments, the first electrode of the first transistor T1 may be connected to the sixth transistor T8 at the fifth node. As described above, the first transistor T1 may receive the first power voltage ELVDD applied from the eighth transistor T8 in the emission period P8 and the emission maintenance period P9.

Referring to FIG. 6, the pixel according to some embodiments of the present disclosure may further include an eighth transistor T8.

According to some embodiments, the eighth transistor T8 may include a gate electrode receiving the emission control signal EM, a first electrode connected to the second node, and a second electrode connected to the fifth node.

As illustrated in FIG. 6, the eighth transistor T8 may be connected to the first transistor T1, the first capacitor C1, and the second capacitor C2 at the second node. Meanwhile, the eighth transistor T8 may be connected to the seventh transistor T7 at the fifth node.

According to some embodiments, the eighth transistor T8 may be turned on or off based on the emission control signal EM. Meanwhile, the eighth transistor T8 may be connected to the seventh transistor T7 at the fifth node (node N). When the eighth transistor T8 is turned on, the eighth transistor T8 may supply the driving current to the seventh transistor T7. For example, the eighth transistor T8 may be turned on in the emission period P8 and the emission maintenance period P9 and may supply the driving current to the first electrode of the seventh transistor T7.

Meanwhile, as illustrated in FIG. 6, the first electrode of the seventh transistor may be connected to the fifth node. As described above, the seventh transistor T7 may receive the driving current supplied from the eighth transistor T8 in the emission period P8 and the emission maintenance period P9.

Referring to FIG. 7, the pixel according to some embodiments of the present disclosure may further include an eighth transistor T8.

According to some embodiments, the eighth transistor T8 may include a gate electrode receiving the emission control signal EM, a first electrode connected to the second node, and a second electrode connected to the fifth node.

As illustrated in FIG. 7, the eighth transistor T8 may be connected to the first transistor T1, the seventh transistor T7, and the second capacitor C2 at the second node. Additionally, the eighth transistor T8 may be connected to the first capacitor C1 at the fifth node.

According to some embodiments, the eighth transistor T8 may be turned on or off based on the emission control signal EM. According to some embodiments, the connection between the first capacitor C1 and the second capacitor C2 may be controlled by turning on or off the eighth transistor T8. This will be described in more detail later.

Meanwhile, as illustrated in FIG. 7, the second electrode of the first capacitor C1 may be connected to the fifth node.

Referring to FIG. 8, the operation of the pixel according to some embodiments of the present disclosure may be controlled based on the first gate signal GW, the second gate signal GI, the third gate signal $GI_{N+M}$, the fourth gate signal $GI_{N-1}$, the fifth gate signal GC, and the emission control signal EM.

According to some embodiments of the present disclosure, as for the pixel further including the eighth transistor T8 that receives the emission control signal EM, it can be understood that the operation is controlled based on the timing diagram illustrated in FIG. 8.

According to some embodiments, the operation of the pixel may be divided into a first period P1 to a ninth period P9 based on signal states of the first gate signal GW, the second gate signal GI, the third gate signal $GI_{N+M}$, the fourth gate signal $GI_{N-1}$, the fifth gate signal GC, and the emission control signal EM. Here, the signal state of each of the first gate signal GW, the second gate signal GI, the third gate signal $GI_{N+M}$, the fourth gate signal $GI_{N-1}$, the fifth gate signal GC, and the emission control signal EM may be any one of a first signal that is a relatively high-level signal, and a second signal that is a lower-level signal than the first signal. According to some embodiments, the first signal may mean a high signal, and the second signal may mean a low signal.

As illustrated in FIG. 8, it can be confirmed that, except that the flow of the emission control signal EM is added, the flows of other signals that control the operation of the pixel are the same as the signal flows illustrated in FIG. 3. Therefore, in FIG. 8, only the operation of the pixel according to the flow of the emission control signal EM will be described.

Referring to FIG. 8, it is illustrated that the emission control signal EM is the first signal in the first to sixth periods P1 to P6, changes to the second signal in the seventh period P7, changes back to the first signal in the eighth period P6, and is the first signal in the ninth period P7.

According to some embodiments, the emission control signal EM may change to the second signal in the seventh period P7 in which the first gate signal GW changes to the first signal. According to some embodiments, the eighth transistor T8 that receives the emission control signal EM may be turned off only in the seventh period P7. According to some embodiments, in the writing period in which a data voltage is applied through the second transistor T2, the eighth transistor T8 may be turned off, thereby reducing transmission loss of the data voltage.

Figure 9:
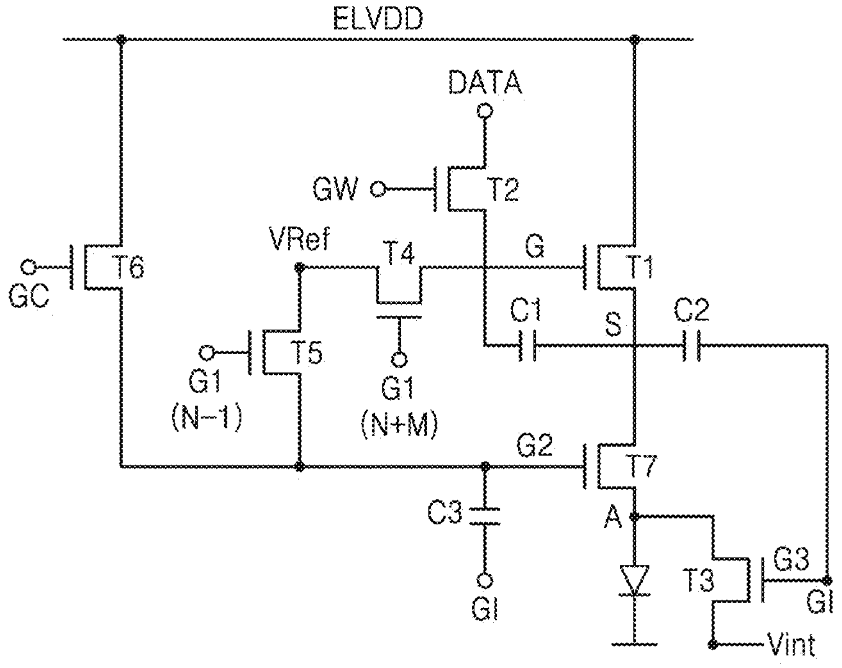
FIG. 9 is a circuit diagram illustrating aspects of a pixel of the display device of FIG. 1.

FIG. 9 is a circuit diagram illustrating further details of a pixel of the display device of FIG. 1, according to some embodiments. Although FIG. 9 illustrates various components in a circuit diagram of a pixel according to some embodiments, embodiments according to the present disclosure are not limited thereto, and according to some embodiments the pixel may include additional components or fewer components without departing from the spirit and scope of embodiments according to the present disclosure.

Referring to FIG. 9, in the pixel according to some embodiments of the present disclosure, the third transistor T3 may include a gate electrode receiving the second gate signal GI, a first electrode connected to the third node, and a second electrode receiving an initialization voltage Vint.

According to some embodiments, the third transistor T3 may be turned on or off based on the second gate signal GI. The third transistor T3 may be connected to the light-emitting element at the third node. According to some embodiments, the third transistor T3 may be turned on in the first initialization period P1 and may apply the initialization voltage Vint to the first electrode of the light-emitting element and the third node. Meanwhile, the third transistor T3 may be connected to the fifth transistor T5 at the third node. According to some embodiments, the third transistor T3 may be turned on in the third initialization period P3, and apply the initialization voltage Vint to the third node and the second electrode of the fifth transistor T5.

Each of the embodiments described above can be implemented independently, but of course, the structure of each of the embodiments can be applied in combination to other embodiments.

As such, embodiments according to the present disclosure have been described with reference to the embodiments illustrated in the drawings, but is merely illustrative, and it will be understood by those skilled in the art that various modifications and variations of the embodiments can be made. Therefore, the scope of embodiments according to the present disclosure should be defined by the appended claims, and their equivalents.

The specific implementations described in the embodiments are merely illustrative, and do not limit the scope of the present disclosure in any way. Furthermore, unless otherwise indicated obviously by terms, such as "essential," "important," etc., a component may not be a necessary component for the application of the present disclosure.

A pixel according to some embodiments of the present disclosure can implement a display device that performs initialization and compensation with a 7T3C circuit configuration. Accordingly, a pixel that is advantageous in terms of integration and manufacturing costs, and a display device including the same can be implemented.

However, the characteristics of embodiments according to the present disclosure are not limited to the characteristics described above, and may be expanded in various ways without departing from the technical idea and scope of embodiments according to the present disclosure.

In the specification (particularly, in the claims) of the embodiments, the use of the term "the" and similar referential terms may refer to both the singular and the plural. In addition, when a range is described in the embodiments, an invention to which individual values belonging to the range are applied is included (unless otherwise described contrarily), and each individual value constituting the range is described in the detailed description. Finally, the steps of the method according to some embodiments can be performed in any suitable order unless otherwise explicitly indicated herein or otherwise clearly contradicted by context. The embodiments are not necessarily limited by the order of steps described above. The use of any examples or illustrative terms in the embodiments are merely to describe the embodiments in more detail, and unless limited by the claims, the scope of embodiments according to the present disclosure are not limited by the examples or illustrative terms. Additionally, it will be understood by those skilled in the art that various modifications, combinations and changes may be made depending on design conditions and factors within the scope of the appended claims or their equivalents.

What is claimed is:

1. A pixel comprising:

a first transistor comprising a gate electrode connected to a first node, a first electrode configured to receive a first power voltage, and a second electrode connected to a second node;

a second transistor comprising a gate electrode configured to receive a first gate signal, a first electrode configured to receive a data voltage, and a second electrode connected to the first node;

a third transistor comprising a gate electrode configured to receive a second gate signal, a first electrode connected to a third node, and a second electrode configured to receive a second power voltage;

a fourth transistor comprising a gate electrode configured to receive a third gate signal, a first electrode connected to the first node, and a second electrode configured to receive a third power voltage;

a fifth transistor comprising a gate electrode configured to receive a fourth gate signal, a first electrode configured to receive the third power voltage, and a second electrode connected to a fourth node;

a sixth transistor comprising a gate electrode configured to receive a fifth gate signal, a first electrode configured to receive the first power voltage, and a second electrode connected to the fourth node;

a seventh transistor comprising a gate electrode connected to the fourth node, a first electrode connected to the second node, and a second electrode connected to the third node;

a first capacitor comprising a first electrode connected to the first node and a second electrode connected to the second node;

a second capacitor comprising a first electrode connected to the second node and a second electrode configured to receive the second gate signal;

a third capacitor comprising a first electrode connected to the fourth node and a second electrode configured to receive the second gate signal; and a light-emitting element comprising a first electrode connected to the third node and a second electrode configured to receive the second power voltage.

2. The pixel of claim 1, wherein the third transistor comprises the second electrode configured to receive an initialization voltage.

3. The pixel of claim 1, further comprising an eighth transistor comprising a gate electrode configured to receive an emission control signal, a first electrode configured to receive the first power voltage, and a second electrode connected to a fifth node, wherein the first electrode of the first transistor is connected to the fifth node.

4. The pixel of claim 1, further comprising an eighth transistor comprising a gate electrode configured to receive an emission control signal, a first electrode connected to the second node, and a second electrode connected to a fifth node, wherein the first electrode of the seventh transistor is connected to the fifth node.

5. The pixel of claim 1, further comprising an eighth transistor comprising a gate electrode configured to receive an emission control signal, a first electrode connected to the second node, and a second electrode connected to a fifth node, wherein the second electrode of the first capacitor is connected to the fifth node.

6. The pixel of claim 1, wherein the second gate signal and the fifth gate signal change from a first signal to a second signal, and when the third gate signal is the first signal, a threshold voltage of the first transistor is compensated.

7. The pixel of claim 6, wherein based on the first transistor being turned on, a voltage that the fourth transistor applies to the gate electrode of the first transistor is equal to a sum of a voltage applied to the second electrode of the first transistor and the threshold voltage of the first transistor.

8. The pixel of claim 1, wherein a completely compensated threshold voltage is maintained for the first transistor based on the first transistor, the second transistor, the third transistor, the fourth transistor, the fifth transistor, the sixth transistor, and the seventh transistor being turned off, based on each of the first gate signal, the second gate signal, the third gate signal, the fourth gate signal, and the fifth gate signal being a second signal.

9. The pixel of claim 1, wherein the second gate signal, the third gate signal, and the fourth gate signal are each a first signal in a same length of period.

10. The pixel of claim 9, wherein the fifth gate signal and the second gate signal are each the first signal in a same length of period.

11. A display device comprising:

a scan driver configured to transmit a plurality of scan signals to a plurality of scan lines;

a data driver configured to transmit a plurality of data signals to a plurality of data lines;

a display unit comprising a plurality of pixels each connected to a corresponding scan line among the plurality of scan lines and a corresponding data line among the plurality of data lines, wherein the plurality of pixels are configured to emit light, respectively, according to corresponding data signals to display an image; and a controller configured to control the scan driver and the data driver, to generate the plurality of data signals, and to apply the generated plurality of data signals to the data driver, wherein each of the plurality of pixels comprises:

a first transistor comprising a gate electrode connected to a first node, a first electrode configured to receive a first power voltage, and a second electrode connected to a second node;

a second transistor comprising a gate electrode configured to receive a first gate signal, a first electrode configured to receive a data voltage, and a second electrode connected to the first node;

a third transistor comprising a gate electrode configured to receive a second gate signal, a first electrode connected to a third node, and a second electrode configured to receive a second power voltage;

a fourth transistor comprising a gate electrode configured to receive a third gate signal, a first electrode connected to the first node, and a second electrode configured to receive a third power voltage;

a fifth transistor comprising a gate electrode configured to receive a fourth gate signal, a first electrode configured to receive the third power voltage, and a second electrode connected to a fourth node;

a sixth transistor comprising a gate electrode configured to receive a fifth gate signal, a first electrode configured to receive the first power voltage, and a second electrode connected to the fourth node;

a seventh transistor comprising a gate electrode connected to the fourth node, a first electrode connected to the second node, and a second electrode connected to the third node;

a first capacitor comprising a first electrode connected to the first node and a second electrode connected to the second node;

a second capacitor comprising a first electrode connected to the second node and a second electrode configured to receive the second gate signal;

a third capacitor comprising a first electrode connected to the fourth node and a second electrode configured to receive the second gate signal; and a light-emitting element comprising a first electrode connected to the third node and a second electrode configured to receive the second power voltage.

12. The display device of claim 11, wherein the third transistor comprises the second electrode configured to receive an initialization voltage.

13. The display device of claim 11, wherein each of the plurality of pixels further comprises an eighth transistor that comprises a gate electrode configured to receive an emission control signal, a first electrode configured to receive the first power voltage, and a second electrode connected to a fifth node, and the first electrode of the first transistor is connected to the fifth node.

14. The display device of claim 11, wherein each of the plurality of pixels further comprises an eighth transistor that comprises a gate electrode configured to receive an emission control signal, a first electrode connected to the second node, and a second electrode connected to a fifth node, and the first electrode of the seventh transistor is connected to the fifth node.

15. The display device of claim 11, wherein each of the plurality of pixels further comprises an eighth transistor comprising a gate electrode configured to receive an emission control signal, a first electrode connected to the second node, and a second electrode connected to a fifth node, and the second electrode of the first capacitor is connected to the fifth node.

16. The display device of claim 11, wherein the second gate signal and the fifth gate signal change from a first signal to a second signal, and when the third gate signal is the first signal, a threshold voltage of the first transistor is compensated.

17. The display device of claim 16, wherein based on the first transistor being turned on, a voltage that the fourth transistor applies to the gate electrode of the first transistor is equal to a sum of a voltage applied to the second electrode of the first transistor and the threshold voltage of the first transistor.

18. The display device of claim 11, wherein a completely compensated threshold voltage is maintained for the first transistor based on the first transistor, the second transistor, the third transistor, the fourth transistor, the fifth transistor, the sixth transistor, and the seventh transistor being turned off, based on each of the first gate signal, the second gate signal, the third gate signal, the fourth gate signal, and the fifth gate signal being a second signal.

19. The display device of claim 11, wherein the second gate signal, the third gate signal, and the fourth gate signal are each a first signal in a same length of period, and the fifth gate signal and the second gate signal are each the first signal in a same length of period.

20. An electronic device, comprising the display device of claim 11.

* * * * *